US012086858B2

(12) United States Patent
Stenzel et al.

(10) Patent No.: US 12,086,858 B2
(45) Date of Patent: Sep. 10, 2024

(54) COMPUTER SYSTEM AND COMPUTER-IMPLEMENTED METHOD FOR OPTIMIZATION OF CROP PROTECTION

(71) Applicant: BASF SE, Ludwigshafen am Rein (DE)

(72) Inventors: Klaus Stenzel, Ludwigshafen (DE); Maximilian Seitz, Limburgerhof (DE); Matthias Nachtmann, Limburgerhof (DE)

(73) Assignee: BASF SE, Ludwigshafen Am Rhein (DE)

( * ) Notice: Subject to any disclaimer, the term of this patent is extended or adjusted under 35 U.S.C. 154(b) by 300 days.

(21) Appl. No.: 17/285,235

(22) PCT Filed: Oct. 18, 2019

(86) PCT No.: PCT/EP2019/078388
§ 371 (c)(1),
(2) Date: Apr. 14, 2021

(87) PCT Pub. No.: WO2020/079231
PCT Pub. Date: Apr. 23, 2020

(65) Prior Publication Data
US 2021/0398190 A1    Dec. 23, 2021

(30) Foreign Application Priority Data

Oct. 19, 2018 (EP) ..................................... 18201551

(51) Int. Cl.
*G06Q 30/00* (2023.01)
*A01B 79/00* (2006.01)
(Continued)

(52) U.S. Cl.
CPC ....... *G06Q 30/0631* (2013.01); *A01B 79/005* (2013.01); *G01W 1/10* (2013.01);
(Continued)

(58) Field of Classification Search
CPC .. G06Q 30/0631; G06Q 10/04; G06Q 10/063; G06Q 30/0282; G06Q 50/02; A01B 79/005; G01W 1/10; A01N 25/00
See application file for complete search history.

(56) References Cited

U.S. PATENT DOCUMENTS

| | | | |
|---|---|---|---|
| 9,009,087 B1 * | 4/2015 | Mewes | G06Q 10/067 706/12 |
| 9,563,852 B1 * | 2/2017 | Wiles | A01B 79/005 |
| 9,792,557 B2 | 10/2017 | Mathur et al. | |
| 10,088,816 B1 | 10/2018 | Anderson et al. | |
| 11,785,879 B2 | 10/2023 | Ethington et al. | |
| 2005/0246066 A1 | 11/2005 | Carney, Jr. et al. | |
| 2010/0106632 A1 * | 4/2010 | Rice | G06Q 30/0283 705/400 |

(Continued)

FOREIGN PATENT DOCUMENTS

| | | |
|---|---|---|
| CA | 2663917 A1 | 10/2010 |
| CA | 2 748 082 A1 | 2/2012 |

(Continued)

OTHER PUBLICATIONS

Citation: Delerce S, Dorado H, Grillon A, RebolledoMC, Prager SD, Patiño VH, et al. (2016) Assessing Weather-Yield Relationships in Rice at Local Scale Using Data Mining Approaches. PLoS One 11(8):e0161620. doi:10.1371/journal.pone.0161620 (Year: 2016).*

(Continued)

*Primary Examiner* — Sun M Li
(74) *Attorney, Agent, or Firm* — Lowenstein Sandler LLP

(57) ABSTRACT

A system (100), method and computer program product for optimization of crop protection, for a particular crop in a particular field. The system receives a predetermined future time interval and real-time weather forecast data and can retrieve corresponding predicted target pressure data (122) representing expected biotic stress factor probabilities for said crop from a crop state prediction model. An optimizer (150) receives the predicted target pressure data (122) for one or more targets and determines an initial target pressure score for the particular field by aggregating all target pressure data in the predetermined future time interval. A protection product recommender (270) provides a plurality (Continued)

of product recommendations with each product recommendation including a mix of protection products suitable for treatment of the one or more targets, and each protection product having protection product characteristics (265) describing the treatment effect of the respective protection product by target. The optimizer determines further target pressure scores for a plurality of combinations of product recommendations and product application time slots by applying the respective protection product characteristics (265) to the target pressure data, and selects the combination with the target pressure score indicating the lowest expected biotic stress for the crop in the field as recommended combination.

14 Claims, 8 Drawing Sheets

(51) Int. Cl.
| | | |
|---|---|---|
| *G01W 1/10* | (2006.01) | |
| *G06Q 10/04* | (2023.01) | |
| *G06Q 10/063* | (2023.01) | |
| *G06Q 30/0282* | (2023.01) | |
| *G06Q 30/0601* | (2023.01) | |
| *G06Q 50/02* | (2012.01) | |

(52) U.S. Cl.
CPC .......... *G06Q 10/04* (2013.01); *G06Q 10/063* (2013.01); *G06Q 30/0282* (2013.01); *G06Q 50/02* (2013.01)

(56) References Cited

U.S. PATENT DOCUMENTS

| | | | | |
|---|---|---|---|---|
| 2014/0012732 | A1* | 1/2014 | Lindores | A01B 79/005 705/37 |
| 2014/0290135 | A1 | 10/2014 | Carraro et al. | |
| 2015/0351376 | A1 | 12/2015 | Wichmann | |
| 2016/0073573 | A1* | 3/2016 | Ethington | G06Q 10/06 705/7.36 |
| 2016/0078375 | A1* | 3/2016 | Ethington | G06Q 10/06 705/7.27 |
| 2016/0202227 | A1* | 7/2016 | Mathur | A01B 79/005 702/2 |
| 2016/0217229 | A1* | 7/2016 | Mewes | A01B 79/005 |
| 2017/0039425 | A1 | 2/2017 | Itzhaky et al. | |
| 2017/0086381 | A1* | 3/2017 | Roell | A01B 79/005 |
| 2017/0169523 | A1* | 6/2017 | Xu | A01B 79/005 |
| 2018/0018414 | A1* | 1/2018 | Biswas | G06F 30/20 |
| 2018/0315135 | A1* | 11/2018 | Sarangi | G06Q 10/06316 |
| 2019/0066234 | A1* | 2/2019 | Bedoya | G06Q 50/02 |
| 2020/0273117 | A1* | 8/2020 | Stenzel | A01B 79/005 |
| 2021/0185887 | A1* | 6/2021 | Ilbasi | A01C 21/005 |

FOREIGN PATENT DOCUMENTS

| | | |
|---|---|---|
| EP | 2420137 A1 | 2/2012 |
| EP | 3046066 A1 | 7/2016 |
| EP | 3287007 A1 | 2/2018 |
| RU | 2668319 C1 | 9/2018 |
| WO | 2014/151732 A1 | 9/2014 |
| WO | 2017/027069 A1 | 2/2017 |
| WO | 2016/040654 A1 | 3/2017 |

OTHER PUBLICATIONS

A model-based approach to assist variety evaluation in sunflower crop Pierre Casadebaig (1), Emmanuelle Mestries (2), Philippe Debaeke (1) (1) AGIR, Université de Toulouse, Inra, Inpt, Inp-Ei Purpan, Castanet-Tolosan, France (2) Terres Inovia, arXiv: 1701. 00987v1 [q-bio.QM] Jan. 4, 2017 (Year: 2017).*

F. C. Wong and N. Y. Lao, "Economic value of remote sensing imagery for agricultural applications," 2003 IEEE Aerospace Conference Proceedings (Cat. No. 03TH8652), Big Sky, MT, USA, 2003, pp. 8_3815-8_3829, doi: 10.1109/AERO.2003.1235566. (Year: 2003).*

An overview of available crop growth and yield models for studies and assessments in agriculture Arianna Di Paola, Riccardo Valentini, Monia Santini First published: Jul. 31, 2015 https://doi.org/10.1002/jsfa.7359 (Year: 2015).*

A review on application of technology systems, standards and interfaces for agriculture and food sector, by Abhijit Suprem, Nitaigour Mahalik, Kiseon Kim, Computer Standards & Interfaces, vol. 35, Issue 4, Jun. 2013, p. 355-364 (Year: 2011).*

A review on application of technology systems, standards and interfaces for agriculture and food sector, by Abhijit Suprem, Nitaigour Mahalik, Kiseon Kim, Computer Standards & Interfaces, vol. 35, Issue 4, Jun. 2013, p. 355-364 (Year: 2011) (Year: 2011).*

An overview of available crop growth and yield models for studies and assessments in agriculture Arianna Di Paola, Riccardo Valentini, Monia Santini First published: Jul. 31, 2015 https://doi.org/10.1002/jsfa.7359 (Year: 2015) (Year: 2015).*

International Search Report and Written Opinion of International Application No. PCT/EP2019/078388 mailed Jan. 21, 2020, 24 pgs.

Rydahl et al., "PC-Plant Protection: optimizing chemical weed control", PO Bulletin: A Journal of Regulatory Plan Protection, Dec. 1, 1993, pp. 589-594, vol. 23, No. 4.

Christensen et al, "A decision algorithm for patch spraying", Weed Research, Aug. 1, 2003, pp. 276-284, vol. 43, No. 4.

"PlantCT (PCT)—result in Brief", URL:https://cordis.europa.eu/result/rcn/22 9064_en.html, May 29, 2018, pp. 1-2.

"PlantCT—Infection Prediciton", URS:https://plantct.com/additional-features, Mar. 1, 2018, pp. 1-25.

Haley, et al., "A Computer Aid for Decision-Making in Apple Pest Management", Second International Symposium on Computer Modelling in Fruit Research and Orchard Management: Utah State University, Logan, Utah, U.S.A., Sep. 5-8, 1989; in: Acta Horticulturae; Technical Communicaiton of ISHS/International Society for HO, Jul. 1, 1990, pp. 27-34, No. 276.

Damos, Petros, "Modular structure of web-based decision support systems for integrated pest management. A review", Agronomy for Sustainable Development, Springer Paris, Paris, Jul. 2, 2015, pp. 1347-1372, vol. 35, No. 4.

Thomas, et al., "Utilization of GIS/GPS-Based Information Technology in Commercial Crop Decision Making in California, Washington, Oregon, Idaho, and Arizona", Journal of Nematology, Sep. 1, 2002, pp. 200-206.

Parsons, et al., "Weed Manager—A model-based decision support system for weed management in arable crops", Computers and Electronics in Agriculture, Mar. 1, 2009, pp. 155-167, vol. 65, No. 2, Elsevier, Amsterdam, NL.

Newe, et al., "proPlant expert.com—an online consultation system on crop protection in cereals, rape, potatoes and sugarbeet*", PO Bulletin: A Journal of Regulatory Plant Protection, Dec. 1, 2003, vol. 33, No. 3.

Stigliani, et al., "SELOMA: Expert System for Weed Management in Herbicide-Intensive Crops", Weed Technology, Sep. 12, 1993, pp. 550-559, vol. 7, No. 3.

Böttcher, et al., "A phenological model of winter oilseed rape according to the BBCH scale," Crop and Pasture Science, 2016, pp. 345-358, vol. 67, No. 3.

Hagelskjaer, et al., "A web-based decision support system for integrated management of cereal pests", EPPO Bulletin, 2003, vol. 33, pp. 467-471.

Kröcher, et al., "Monitoring of Plant Pests and Diseases as a Base of the Germany-Wide Online Decision Support System ISIP", J. Verbr. Lebensm., Aug. 1, 2007, vol. 2, pp. 50-51.

Magarey, et al., "NAPPFAST: An Internet System for the Weather-Based Mapping of Plant Pathogens", Plant Dis., Apr. 2007, vol. 91, pp. 336-345.

Neeser, et al., "WeedSOFT@: A weed management decision support system.", Weed Science, 2004, vol. 52, pp. 115-122.

(56) References Cited

OTHER PUBLICATIONS

Dipaola, et al., "An overview of available crop growth and yield models for studies and assessments in agriculture", Journal of the Science of Food and Agriculture, 2016, vol. 96, pp. 709-714.

Rydahl, P., "A web-based decision support system for integrated management of weeds in cereals and sugarbeet", EPPO Bulletin, 2003, vol. 33, pp. 455-460.

Rydahl, et al, "User interfaces and system architecture of a web-based decision support system for integrated pest management in cereals", EPPO Bulletin, 2003, vol. 33, pp. 473-481.

\* cited by examiner

410

| PName | BBCH from | BBCH to | PUCCST | PUCCRE | PYRNTR | SEPTTR | LEPTNO | FUSASP | PSDCHE | ERYSGR |
|---|---|---|---|---|---|---|---|---|---|---|
| Cap | 30 | 36 | 50 | 100 | 100 | 100 | 100 | 0 | 100 | 100 |
| Ele | 30 | 36 | 100 | 100 | 100 | 100 | 100 | 0 | 100 | 0 |
| Cer | 37 | 59 | 100 | 100 | 100 | 100 | 100 | 0 | 100 | 100 |
| Ade | 37 | 59 | 100 | 100 | 100 | 100 | 100 | 0 | 100 | 100 |
| CerVeg | | | 100 | 100 | 100 | 100 | 100 | 0 | 100 | 100 |
| Os 2.0l | 60 | 69 | 100 | 100 | 100 | 100 | 0 | 0 | 0 | 0 |
| Os 2.5l | 60 | 69 | 100 | 100 | 100 | 100 | 0 | 100 | 0 | 0 |

0 = no treatment effect
50 = partial treatment effect
100 = full treatment effect

| PName | PUCCST | PUCCRE | PYRNTR | SEPTTR | LEPTNO | FUSASP | PSDCHE | ERYSGR |
|---|---|---|---|---|---|---|---|---|
| Cap | 10 | 22 | 17 | 13 | 21 | 0 | 22 | 11 |
| Ele | 16 | 24 | 18 | 15 | 11 | 0 | 25 | 0 |
| Cer | 21 | 18 | 16 | 23 | 23 | 0 | 23 | 13 |
| Ade | 19 | 21 | 23 | 17 | 20 | 0 | 14 | 10 |
| CerVeg | 22 | 19 | 24 | 23 | 18 | 0 | 17 | 23 |
| Os 2.0l | 23 | 19 | 17 | 17 | 0 | 0 | 0 | 0 |
| Os 2.5l | 17 | 22 | 15 | 15 | 0 | 22 | 0 | 0 | n = protective effect period (days)
0 = no effect

| PName | PUCCST | PUCCRE | PYRNTR | SEPTTR | LEPTNO | FUSASP | PSDCHE | ERYSGR |
|---|---|---|---|---|---|---|---|---|
| Cap | 10 | 20 | 21 | 14 | 25 | 0 | 22 | 24 |
| Ele | 19 | 20 | 18 | 20 | 22 | 0 | 21 | 0 |
| Cer | 21 | 22 | 16 | 18 | 22 | 0 | 23 | 0 |
| Ade | 22 | 21 | 19 | 20 | 24 | 0 | 19 | 0 |
| CerVeg | 22 | 21 | 19 | 20 | 24 | 0 | 19 | 21 |
| Os 2.0l | 0 | 21 | 22 | 25 | 26 | 0 | 0 | 0 |
| Os 2.5l | 0 | 21 | 22 | 25 | 26 | 23 | 0 | 0 |

FIG. 4C n= curative effect period (days)
0 = no effect

440

| PName | PUCCST | PUCCRE | PYRNTR | SEPTTR | LEPTNO | FUSASP | PSDCHE | ERYSGR |
|---|---|---|---|---|---|---|---|---|
| Cap | 1 | 0 | 0 | 1 | 0 | 0 | 0 | 0 |
| Ele | 1 | 0 | 0 | 1 | 0 | 0 | 0 | 0 |
| Cer | 1 | 0 | 0 | 1 | 0 | 0 | 0 | 0 |
| Ade | 1 | 0 | 0 | 1 | 0 | 0 | 0 | 0 |
| CerVeg | 1 | 0 | 0 | 1 | 0 | 0 | 0 | 0 |
| Os2.0l | 1 | 0 | 0 | 1 | 0 | 0 | 0 | 0 |
| Os2.5l | 1 | 0 | 0 | 1 | 0 | 0 | 0 | 0 |

FIG. 4D n= eradicative effect period (1 day)
0 = no effect

700

| combination | target pressure score |
|---|---|
| P1, P2, P4 / D1 | optimal target score TS |
| P2, P3, P4 / D2 | TS + ΔTS1 |
| P2, P4 /D1 | TS +ΔTS2 |
| P4 /D1 | TS +ΔTS3 |

FIG. 7

$$501 \quad g(f(p)) \to \min(f(p_{p=1}^{P}))$$

$$502 \quad f(p) = \sum_{t=1}^{T} \left( NPT_t * K\_NPT_t + TP_t * K\_TP_t + PC_p * K\_PC_p \right)$$

FIG. 5

COMPUTER SYSTEM AND COMPUTER-IMPLEMENTED METHOD FOR OPTIMIZATION OF CROP PROTECTION

TECHNICAL FIELD

The present invention generally relates to optimization of crop protection and more particularly to systems and methods for minimizing the non-protected time interval for a crop in a particular field in view of real-time weather forecasts.

BACKGROUND

Crop protection products (including at least chemical crop protection products and biological crop protection products) are used when growing crops to increase the yield. Preferably, crop protection products are chemical crop protection products. The term crop protection, as used herein, includes but is not limited to chemical crop protection, fertilization, and biological crop protection. Preferably, crop protection is chemical crop protection. Examples for chemical crop protection products are: pyraclostrobin, azoxystrobin, picoxystrobin, fluxapyroxad, cyproconazole, metconazole, epoxiconazole, mefentrifluconazole, boscalid, Kresoxim-methyl, dimoxystrobin, triticonazole, thiophanate-methyl, fipronil, broflanilide, abamectin, afidopyropen, alpha-cypermethrin, chlorfenapyr, chlorantraniliprole, cyantraniliprole, metaflumizone, pyridaben, teflubenzuron, thiamethoxam, imidacloprid, sulfoxaflor, aminopyralid, dicamba, diflufenzopyr, glyphosate, imazapyr, metazachlor, 2,4-dichlorophenoxyacetic acid (2,4-D), cinmethylin, pendimethalin, saflufenacil, tembotrione, topramezone, or products based on these active ingredients. Examples for biological crop protection products are: *Bacillus amyloliquefaciens* (an example for a product based on *Bacillus amyloliquefaciens*, strain MBI600, is Serifel®), *Beauveria bassiana* (an example for a product based on *Beauveria bassiana* is Broadband®), *Bacillus firmus, Bacillus subtilis, Bradyrhizobium, Bacillus pumilus, Bacillus licheniformis, Paenibacillus polymyxa, Paenibacillus epiphyticus, Pasteuria nishizawae, Penicillium bilaiae*, or products based on these microorganisms, as well as biochemical active ingredients such as fusaricidins and cis-jasmone, or products based on these active ingredients.

"Crop", as used herein, is a plant or plant product that can be grown and harvested on a field. However, it is critical for an improved yield or even to avoid total loss, to apply the right crop protection products for a particular crop at the right time to the right target. In general, there is a n:n relationship between biotic stress factors (targets) and crops. In other words, multiple targets may affect a particular crop and the same target may affect multiple crops. However, the yield reduction effect of a particular target may vary for different crops. A crop protection product may include single Active Ingredients, combinations of Active Ingredients or combinations of Adjuvants. In other words, crop protection products, as used herein, include but are not limited to active ingredients, compositions, mixture and formulations comprising one or more active ingredients, formulants, co-formulants, adjuvants, inerts, solvents, and water. "Target" as used herein describes a particular biotic stress factor, such as for example, a particular infestation or a particular crop disease which can be treated by a crop protection measure. In other words, a particular biotic stress factor is one of a disease, an animalistic pest, or a weed, affecting said crop. The crop protection measure can include the application of one or more crop protection products to the affected crop. Examples for crops are cereals, oil seed rape, corn, potatoes, sugar beets, rice, soybeans, sugarcane, cotton, fruits, vegetables, and legumes. Infestations include but are not limited to, microbial infestation, insect pest infestation, weed infestation, or any challenges regarding plant health, plant nutrition or plant growth. Overall, at least several hundreds of targets are known in the art, which include weeds, weed grasses, fungal, bacterial or viral pathogens and animalistic pests, especially insects. Many different crop protection products are available to counter such infestations or diseases. Such products can be segmented into segments, such as for example: insecticides (i), fungicides (f), herbicides (h), nitrogen stabilisators (n), growth regulators (g), nematicides, molluscicides, rodenticides, acaricides, bactericides, algaecides, antimicrobials, fertilizers, soil amendments, and soil additives. Commercially available compounds can be found in "The Pesticide Manual", 17th Edition, British Crop Protection Council (2015) among other publications, and its online database https://www.bcp-c.org/product/bcpc-online-pesticide-manual-latest-version.

In some cases, where a crop is affected by one or more targets, it can be advantageous to combine multiple products into a product mix (e.g., a spray mix of respective crop protection products) which is applied to the respective crop. However, the selection of the right products depends on many factors, such as for example, the growth stage of the crop, the climate, the weather conditions, the current season, the recently applied products, the product characteristics, etc. For mixtures of protection products additional selection parameters can be compatibility of products, use rate adaption, registration restrictions, resistance issues, or preferable mode of action combination. For example, systems and methods for applying liquid mixtures are described in WO2013/087103 A1.

For optimizing the crop yield of a particular field it can be advantageous to determine the appropriate spray mix (consisting of one or more protection products) to be applied to the field dependent on past and future conditions prevailing in the field and the available protection products. It is a goal of any farmer to apply protection products in such a way that protection of the crops in the particular field is optimized in that the non-protected periods are kept at a minimum.

In computer science, the term "field" is often used for elements of data structures. It is to be noted that in the following description the term "(data) field" when used in the context of data records stored in data structures relates to a property field of the data structure where respective values are stored for the various data records. The term "field" is also used in relation to an agricultural field of a farm where crop is grown. For a person skilled in the art the respective meaning is clear from the context of the description. To avoid any confusion, sometimes data fields of the data structure(s) are also referred to as properties or property fields.

SUMMARY

There is a need to provide technical solutions which support the farmer to apply appropriate protection products to the crop in a field at such points in time where optimized protection periods can be expected, thus, leading to an optimized crop yield in the field.

This technical problem is solved by embodiments according to the independent claims. In one embodiment, a computer-implemented method is provided for optimizing crop protection for a particular crop grown in a particular field. Further embodiments include a computer program product including instructions that cause a computer system to execute said method when running said program. The computer system itself, which is configured to execute said method, is a further embodiment.

The computer system has an interface to receive a predetermined future time interval and real-time weather forecast data for a geographic region including said crop field. The predetermined future time interval describes a future period for which the computer system is expected to perform an analysis (prognosis) and to provide recommendations to a user of the system (e.g., a farmer). For example, the predetermined future time interval can be a default value (e.g., the next three months) or it may be derived from a corresponding user input. Alternatively, it may be determined by the computer system dynamically dependent on certain field conditions. For example, there may be periods in the growth of the crop where shorter future time intervals are appropriate than in other periods. Real-time weather forecast data typically include more accurate short-term weather forecast data which predict the weather for the coming hours or days (including temperature, wind, rainfall, etc.), and may also include less accurate long-term weather forecast data which make predictions for the coming weeks or even months (including average day/night temperatures, average rainfall quantities, etc.). Typically, such long-term forecast data is based on models taking into account historic climate data of said geographic region.

The computer system receives, from a crop state prediction model, in relation to the predetermined future time interval, predicted target pressure data representing expected biotic stress factor probabilities for said crop during the predetermined future time interval in view of real-time weather forecast data for the particular field. For example, a request generator may generate a corresponding request at least based on the future time interval of interest and the weather forecast data which is required as prediction model input. Alternatively, such a corresponding request may be directly received via the interface.

A particular biotic stress factor affecting said crop, referred to as a target herein, is one of a disease, an animalistic pest, or a weed. In other words, targets cause harm to the crop in the field in that they negatively affect the crop yield in the field. Crop state prediction models are well known in the art. Typically, a crop state prediction model includes a growth stage (sub) model and a target pressure (sub) model. The crop state prediction model can be an integral part of the computer system or it can be implemented on a remote system accessible by the computer system via appropriate communication channels (e.g., via the Internet).

For example, crop modelling with growth stage models is described in the following publications:

Di Paola, A., Valentini, R., Santini, M., 2016. An overview of available crop growth and yield models for studies and assessments in agriculture. Journal of the science of food and agriculture 96, 709-714. 10.1002/jsfa.7359; and Goudriaan, J., Laar, H. H., 1994. Modelling Potential Crop Growth Processes: Textbook with Exercises. Springer Netherlands, Dordrecht, Online-Resource.

Target pressure (or disease) models are described in the following publications:

Jörg, E., Bartels, M., 2008. Ökonomischer and gezielter Einsatz von Pflanzenschutzmitteln, in: Tiedemann, A.v. (Ed.), Pflanzenproduktion im Wandel—Wendel im Pflanzenschutz. Themenschwerpunkt der 56. Deutschen Pflanzenschutztagung 2008 in Kiel. DPG Selbstverl., Braunschweig, pp. 150-160;

Newe, M., Meier, H., Johnen, A., Volk, T., 2003. proPlant expert.com—an online consultation system on crop protection in cereals, rape, potatoes and sugarbeet*. EPPO Bulletin 33, 443-449. 10.1111/j.1365-2338.2003.00678.x;

Magarey, R. D., Fowler, G. A., Borchert, D. M., Sutton, T. B., Colunga-Garcia, M., Simpson, J. A., 2007. NAPPFAST: An Internet System for the Weather-Based Mapping of Plant Pathogens. Plant Dis. 91, 336-345. 10.1094/PDIS-91-4-0336;

Kröcher, C. von, Rohrig, M., 2007. Monitoring of Plant Pests and Diseases as a Base of the Germany-Wide Online Decision Support System ISIP. J. Verbr. Lebensm. 2, 50-51. 10.1007/s00003-007-0237-0; and Hagelskjaer, L., Jorgensen, L. N., 2003. A web-based decision support system for integrated management of cereal pests. EPPO Bulletin 33, 467-471. 10.1111/j.1365-2338.2003.00681.x.

For example, a growth stage model for a particular crop can be based on the so-called BBCH-scale used to identify the phenological development stages of a plant. A series of BBCH-scales have been developed for a range of crop species. Phenological development stages of plants are used in a number of scientific disciplines (crop physiology, phytopathology, entomology and plant breeding) and in the agriculture industry (timing of pesticide application, fertilization). BBCH officially stands for "Biologische Bundesanstalt, Bundessortenamt und CHemische Industrie". The BBCH-scale uses a decimal code system, which is divided into principal and secondary growth stages, and is based on the cereal code system (Zadok's scale). Other growth stage scales may be used instead by the skilled person.

Implementation of the BBCH coding system for particular crop phenology simulation can allow detailed description of crop ontogeny necessary for crop management and crop growth modelling. BBCH model examples are described, for example, in "A phenological model of winter oilseed rape according to the BBCH scale" by Ulf Boettcher et al in Crop and Pasture Science 67(3), January 2016. Six phenological phases were reproduced daily according to the BBCH codes (00-89): emergence (00-09), leaf development (10-19), stem elongation (30-39), inflorescence emergence (50-59), flowering (60-69) and pod development-maturation period (70-89). This model takes into account temperature (including vernalisation) and photoperiod as the main environmental forces affecting crop phenology. The macro stages of leaf development and shooting were reproduced considering the rates of leaf appearance and internode extension.

The target pressure model receives from the growth stage model the predicted growth stage periods for the crop in view of the provided weather forecast data as an input and computes for each growth stage the expected biotic stress factor (target) probabilities for said crop. The target pressure model has knowledge about the probabilities that one or more particular targets will occur during a particular growth stage of a particular crop under particular conditions. In literature, target pressure models are often referred to as pest and disease models. Such models quantify the impacts of plant pests and diseases on crop performances. In some embodiments, the predicted target pressure data provided by the crop state prediction model may take into account protection product applications which occurred in the past in said field. For example, if a particular product was applied two weeks ago, the predicted target pressure data is corrected in the crop state prediction model in accordance with the treatment effect of said protection product.

The predicted target pressure data for one or more targets are finally received by an optimizer module of the computer system. For example, the predicted target pressure data indicates for the crop that a particular target will occur during a certain growth stage of the crop under the forecasted weather conditions with a particular probability. In addition, past product applications in the field can also affect the predicted target pressure data as described above.

In an optional embodiment, the optimizer may receive real-time diagnostic data for said crop. The real-time diagnostic data includes actual target pressure data estimates for at least one target being present in the field. For example, the real-time diagnostic data may be received from the user via a user interface. Alternatively, real time diagnostic data may be received from a diagnosis system analyzing the crop health state, for example, by using image processing based diagnostic methods known in the art. If an actual target pressure value for a particular target can be identified or estimated, it would not make sense for the optimizer to used predicted target pressure data for said target because, in case the predicted data deviate from the actual data the optimizer would perform computations not in line with the actual situation in the field. Therefore, the optimizer adjusts the corresponding predicted target pressure data in accordance with the at least one estimate prior to performing further computations. For example, if the predicted target pressure for a particular target is 0.2 for the current growth stage of the crop and the farmer has actually identified said target already in the field the system can overwrite the predicted probabilities with the actual value—namely with a probability of 1 as the target is already present.

Based on the target pressure data (predicted target pressure data or, in the optional embodiment, actual target pressure data), the optimizer determines an initial target pressure score for the particular field by aggregating all target pressure data in the predetermined future time interval. In such embodiments where the predicted target pressure data also includes the information about protection product applications in the past, the initial target pressure score can be lower than it would be without such past product applications because some target pressure probabilities may be reduced due to the treatment effect of the respective protection product. In one embodiment, aggregating can be implemented as computing the sum of all target pressure probabilities (for all targets and all prediction intervals within the future time interval). In another embodiment, aggregating may be implemented as computing a weighted sum of all target pressure probability values wherein different weights can be assigned to different targets in accordance with their respective potential of negatively affecting the crop yield in the field.

The optimizer then retrieves a plurality of protection product recommendations from a protection product recommender. The protection product recommender can be an integral part of the computer system or it can be provided by a remote system communicatively coupled with the computer system. Each product recommendation includes a mix of protection products suitable for treatment of the one or more targets identified in the target pressure data (predicted or adjusted). Thereby, a mix of protection products as used herein can include a single protection product or a plurality of protection products.

Product recommendation tools are known in the art. Such tools typically build on empirical knowledge available in a database associating protection products with respective targets for which effective treatment is achieved by the associated protection products.

Each protection product has protection product characteristics describing the treatment effect of the respective protection product by target. The protection product characteristics comprise a treatment efficiency indicator by respective target describing the effect of the treatment by the respective protection product on the respective target, and at least one effective treatment period by respective target.

The treatment efficiency indicator of a particular protection product for a particular target describes to which extent a treatment of the particular target is successful during the respective growth stages of the crop, the weather conditions, the crop variety, the soil type etc. For example, in an early growth stage the protection product may be able to achieve a 30% treatment of the target whereas in a later growth stage the same product may be able to achieve a 100% treatment. The effective treatment period of the product for said target can include one or more of the following periods:

a protective effect period by respective target wherein the protective effect period represents a future time interval following an application of the respective protection product during which the crop stays protected against the respective target after the application of the respective protection product. In other words, the protective period represents the time period after the application of the protection product during which the protection product still has a positive treatment effect on said target. Thereby, a protective effect of a protection product is present when the effect of the product is a preventive measure in that the protection product is applied before an infection occurs and prevents the infection for the duration of the protective effect period;

a curative effect period by respective target wherein the curation effect period represents a past time interval during which the crop is retroactively protected from the application of the respective protection product against the respective target. In other words, the curative effect period represents the time period before the application of the protection product during which the protection product has a positive treatment effect on said target. Thereby, a curative effect of a protection product is present when the effect of the product actively combats infected spots and stops the infection in the early stage;

an eradicative effect period by respective target wherein the eradicative effect period represents a future application date for the respective protection product against the respective target, leading to a complete eradication of plant pathogens within said crop following the protection product application. Thereby, an eradicative effect of a protection product is present when the product successfully combats an infection which is already present for some time (i.e., when the infection symptoms are already visible).

The protection product characteristics may be stored in data structures or may be provided via respective time and weather dependent models.

The optimizer now determines combinations of protection product recommendations and potential application time slots. That is, each protection product mix provided in a product recommendation is combined with any possible application time slot during the predetermined future time interval from the original request. The number of combinations may become quite substantial applies the plurality of combinations of product recommendations as it includes every single protection product recommendation as well as any possible mix of protection products in combination with each possible application time slot (e.g., on a daily basis). Once all combinations are determined, for each combination the optimizer applies the protection product characteristics to the target pressure data. In other words, the initial target pressure data (predicted or adjusted) are modified by the optimizer to reflect the treatment effect of the respective product mix when applying the treatment efficiency indicator values of the product mix at the application date of the respective combination by taking into account the one or more effective treatment periods. For example, if a target pressure of 0.4 is predicted for a particular target during 15 days after the current date, and a product mix with an efficiency indicator of 1 and a protective period of 13 days is applied to said target pressure data with an application date on the day after the current date, the target pressure of said target would be reduced to 0 for the first 13 days (protective effect) and stays at 0.4 for the following two days. In other words, by applying the protection product characteristics to the initial target pressure data for each combination the optimizer generates for each combination a simulated target pressure matrix reflecting the treatment effect of said combination in relation to the respective targets. For each simulated target pressure matrix the optimizer determines a respective target pressure score. In other words, the optimizer determines further (simulated) target pressure scores for the plurality of combinations of product recommendations and product application time slots by applying the respective protection product characteristics to the initial target pressure data. In embodiments where the target pressure scores are computed as the sum or the weighted sum of the target pressure values, the lowest (simulated) target pressure score indicates the lowest expected biotic stress for the crop in the field. In other words, if the protection product mix of the corresponding combination is applied at the respective application date, the protected period is optimized for said crop in the field—at least in situations where the lowest (simulated) target pressure score of the selected combination is lower than the initial target pressure score.

The optimizer therefore selects the corresponding combination associated with the target pressure value indicating the lowest expected biotic stress for the crop in the field as recommended combination if the target pressure score of the selected combination is lower than the initial target pressure score. If the initial target pressure score is actually lower, no product application is recommended because the current situation in the field is already the optimal situation and no improvement could be achieved by the application of any available protection product.

In one embodiment, the optimizer can consider further parameters for determining the further target pressure scores. For example, for each combination of the plurality, non-protected time intervals can be determined per target based on the effective treatment periods of the respective protection products. The non-protected time intervals for a particular target include all days of the predetermined future time interval during which no treatment effect of the applied products exists. In other words, the non-protected time intervals are determined as the difference between the number of days in the predetermined future time interval and the number of days in the effective treatment periods of the applied products. The optimizer then computes an aggregate non-protected time index for each combination based on the non-protected time intervals. For example, the aggregate non-protected time index can be computed as the sum of all days in the non-protected time intervals. Alternatively, a weighting mechanism may be applied so that the non-protected time index has lower weight in the computation of the target pressure score than the contribution of the respective target pressure data. Finally, the optimizer adds the aggregate non-protected time indices to the respective target pressure scores for all possible combinations.

In one embodiment, the computer system can provide the selected combination as a protection product mix recommendation with product application time slots for the particular field to a farming user via its user interface.

In one embodiment, the computer system can further provide, to the farming user, a ranking list with further combinations indicating potential substitute protection product mixes. The ranking is performed based on the respective target pressure scores to reflect an increasing non-protected time interval for the crop in the field for lower ranking combinations. In other words, the combinations leading to simulated target pressure scores which represent combinations with a treatment efficiency worse than the top scoring combination but still with a reasonable treatment efficiency may be useful as substitute product mixes. For example, the system can be configured to provide a top n list of combinations to the user (e.g., with 3<n<10) from which the user can select a substitute product mix. This may be relevant in situations where an immediate application is necessary (e.g., because of forecasted weather change) but one product in the top ranking combination is not available. In such a case the farmer may prefer to apply the second or third best combination rather than to wait for the missing product to arrive and possible miss the application time slot with the high treatment efficiency. Thereby, the product application time slots may relate to one or more days associated with a BBCH code of said crop.

In one embodiment, the system can provide the product mix information of the selected combination or of a potential substitute combination as a control instruction to a sprayer appliance to generate a tank mix with the crop protection products of the selected combination.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

BRIEF DESCRIPTION OF THE DRAWINGS

FIG. 4A is a table illustrating treatment efficiency of various protecting products against some example targets;

FIG. 4B is a table showing protective effect period data for multiple protection products and multiple targets;

FIG. 4C is a table showing curative effect period data for multiple protection products and multiple targets;

FIG. 4D is a table showing eradicative effect period data for multiple protection products and some targets;

FIG. 5 illustrates formulas to determine, according to one embodiment, target pressure scores for a particular crop in a given field situation;

FIG. 7 illustrates a ranking list with substitute product mixes according to an embodiment;

DETAILED DESCRIPTION

Figure 1:
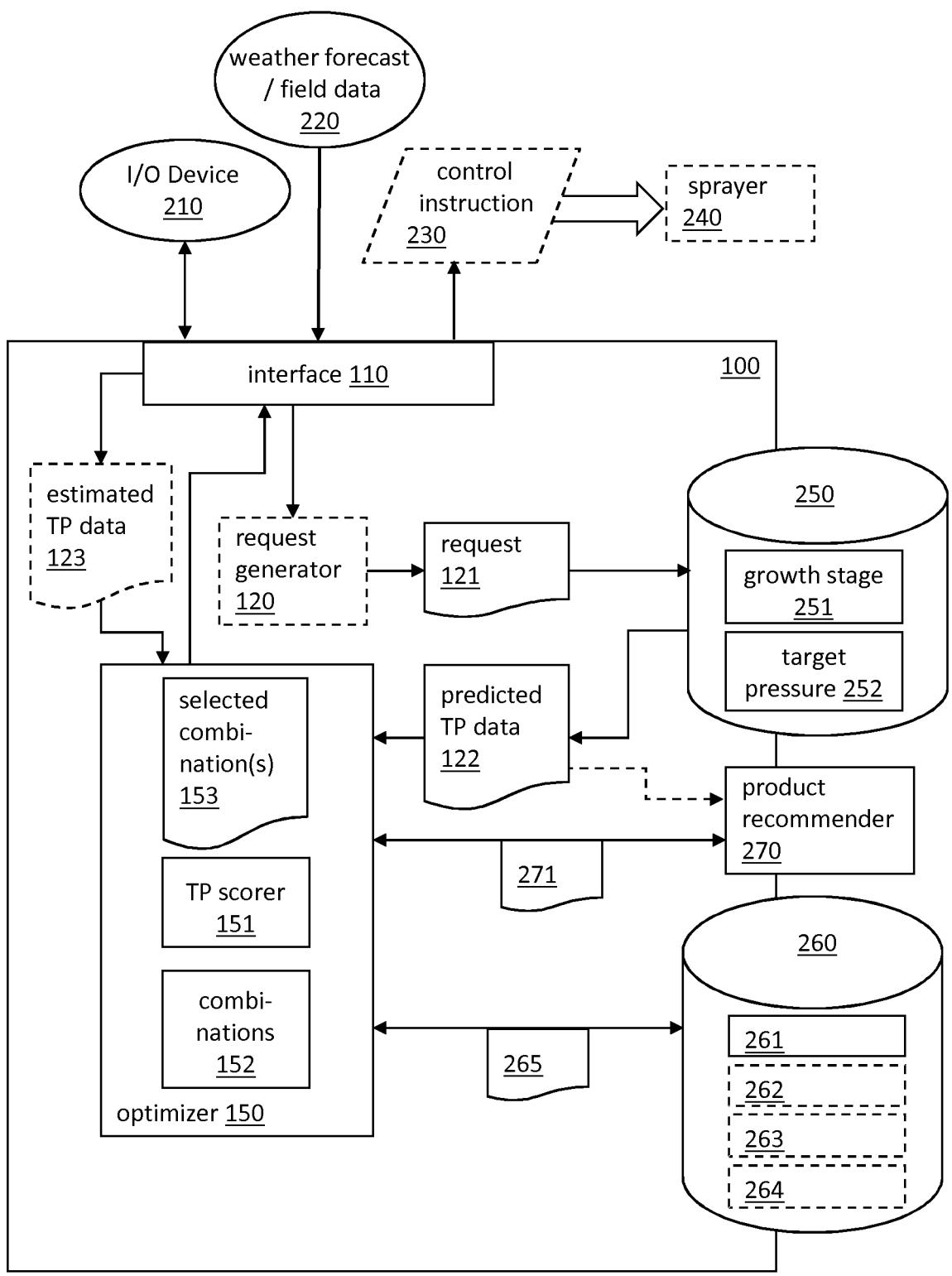
FIG. 1 is a simplified block diagram of a computer system for optimization of chemical crop protection for a particular crop grown in a particular field according to an embodiment.
Figure 2:
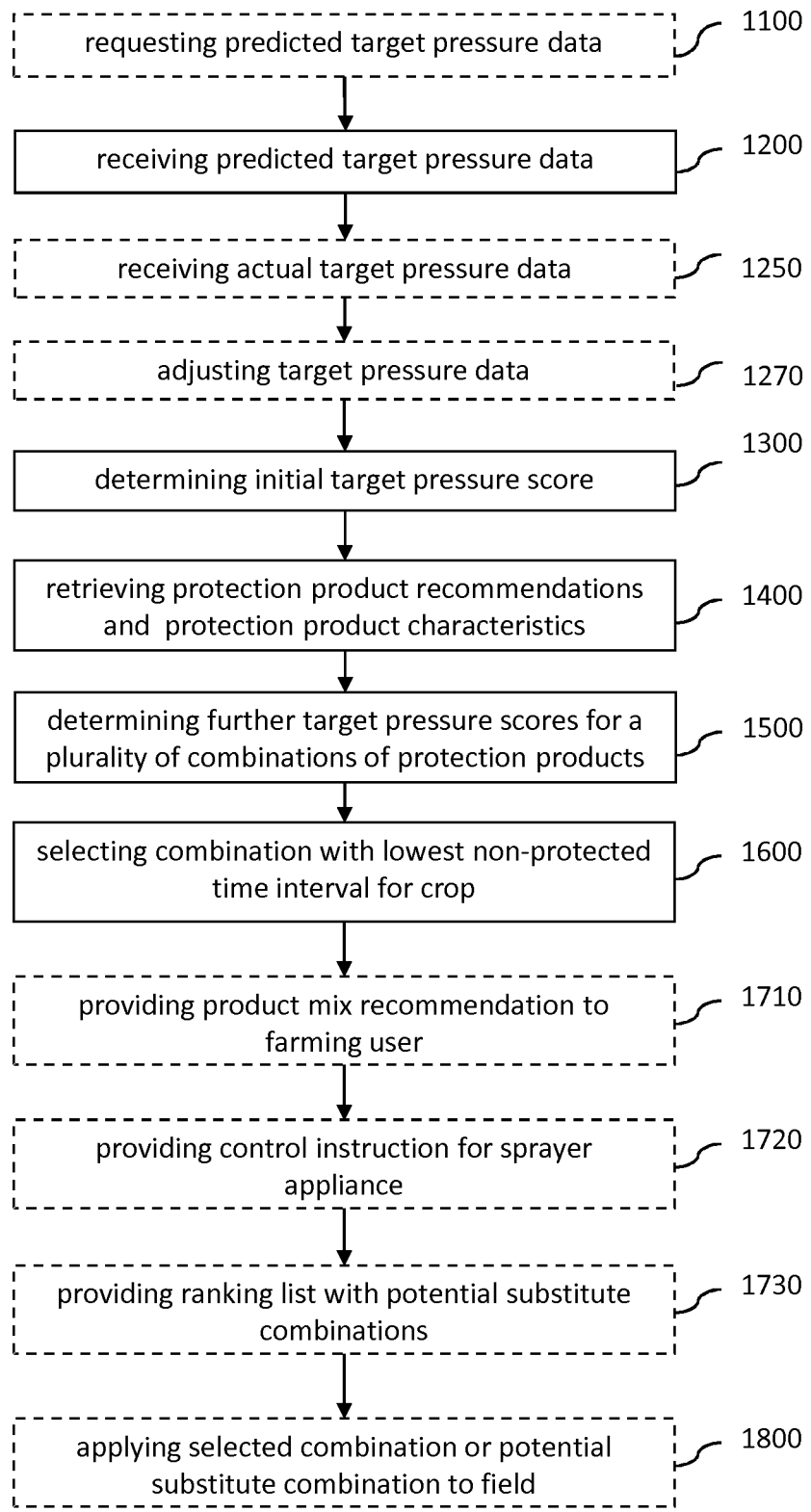
FIG. 2 is a simplified flow chart of a method for optimization of chemical crop protection performed by the computer system according to an embodiment.

FIG. 1 shows a simplified block diagram of a computer system 100 for optimization of chemical crop protection for a particular crop grown in a particular field according to an embodiment. The computer system may be used to control a sprayer device applied to the respective field. FIG. 1 will be discussed in the context of FIG. 2 which is a simplified flow chart of a computer-implemented method 1000 for optimization of chemical crop protection performed by the system 100 of FIG. 1 according to an embodiment of the invention. Reference numbers therefore may refer to FIG. 1 or FIG. 2.

The computer system 100 has an interface 110 to enable communication with external entities, such as for example, a human user (via a human machine interface implemented with I/O device 210), or external systems (e.g., a system 220 providing weather forecast data or other environmental data describing the situation in the field), or devices (e.g., the sprayer device 240) which can be controlled by the computer system via respective control instructions 230. The interface 110 receives at least real-time weather forecast data for the field (where said crop is grown) from a corresponding data source 220. The real-time weather forecast data includes short term weather prediction data for relatively short future periods for which weather forecast data can be provided with relatively high reliability (a skilled person knows typical forecast ranges for which reliable forecast data can be provided). Such weather forecast data can be updated in real-time (for example, every hour or even more frequently when weather conditions show a high risk for thunderstorms). Further, weather forecast data may include mid-term forecast data (e.g., covering the following 7 days) which typically are less reliable than the short term prediction data. Long-term weather forecast data may be provided on the basis of historic climate data for the region covering said field. The weather forecast data can implicitly provide a predetermined future time interval as the time interval for which weather forecast data is available. The predetermined future time interval is later on used by the computer system as the time range for which prediction analysis is to be performed. Alternatively, the future time interval may be received as a user input from I/O device 210 or it may be set as a default value in the computer system 100.

In some embodiments, the computer system may further receive field data describing the current situation in the field. For example, data about soil moisture or previous applications of protection products may be provided via interface 110. Further, the user or a plant disease diagnosis system may provide real-time data from the field about the presence of biotic stress factors in the field (estimated real-time target pressure data 123).

In relation to the predetermined future time interval, the computer system 100 requests 1100 predicted target pressure data 122 representing expected biotic stress factor probabilities (target pressure values) for said crop during the predetermined future time interval in view of real-time weather forecast data 210 for the particular field. For this purpose, for example, a request generator 120 may generate a corresponding request 121 to a crop state prediction model 250 to provide predicted target pressure data for the respective field in view of real-time environmental conditions including the weather forecast data. Optionally, field condition data may be provided with the request 121, such as for example, the before mentioned soil moisture data or data about previously applied protection products. The request may also be received directly via the interface 110. The crop state prediction model can be an integral part of the computer system 100 or it can be provided on remote computer which can be accessed by the computer system. Typically, the crop state prediction model includes sub-models such as a growth state model 251 and a target pressure (or disease) model 252. Such models are well known in the art of chemical crop protection. Typically, such models are built on empirical data collected in the past for the various growth stages of various crops. Such models can simulate the future growth of the crop in view of the forecasted weather conditions (and/or other field condition data), and further can compute probabilities that the crop will be affected by a certain biotic stress factor (target) under the predicted weather conditions. That is, in response to the request 121, the crop state prediction model 250 provides the requested predicted target pressure data 122 for one or more targets for the predetermined future time period. For example, the predicted target pressure data 122 is typically a matrix with a first dimension including the different targets which are identified by the crop state prediction model as a risk to the future crop yield in the field under the conditions specified in the request 121, and a second dimension with the days included in the predetermined future time interval. The matrix values are the respective target pressure probabilities for each of the identified targets on a daily basis.

In an optional embodiment, the optimizer 150 further receives 1250 real-time diagnostic data including real-time estimated target pressure data 123 via interface 110. Such actual target pressure data estimates reflect the current situation in the field and provide information to the optimizer whether a particular target is actually already identified in the field. Of course, the real-time estimates for already present targets are more relevant than any predicted target pressure data for this particular target. Therefore, the optimizer firstly adjusts 1270 the corresponding received (predicted) target pressure data in accordance with the actual target pressure estimates. For example, if a predicted target pressure value for said target was 60%, the value is adjusted to 100% if the target is identified as already being present in the field.

The optimizer 150 has a scoring module (TP scorer) 151 to determine 1300 an initial target pressure score for the particular field by aggregating all target pressure data in the predetermined future time interval. Aggregating all target pressure data can be implemented by summing up all probabilities included in the target pressure matrix (i.e., for all targets and all days in the future time interval). This leads to a single number which reflects the overall risk for the entire field that the crop will be affected by the identified targets.

The targets which appear in the received target pressure data (predicted or adjusted) are provided to a product recommender module 270 to retrieve 1400 a plurality of protection product recommendations 271. The product recommender module 270 may be an integral part of the computer system 100 or it may be a component of a remote computer accessible by the computer system 100. The product recommender 270 is a tool which can provide multiple alternative recommendations 271 for protection product mixes which are suitable for treatment of the expected/actual targets. Such tools are commercially available. Examples of such tools are Crop Protection Online (cf. Rydahl, P., 2003: "A web-based decision support system for integrated management of weeds in cereals and sugarbeet", EPPO Bulletin 33, 455-460. 10.1111/j.1365-2338.2003.00679.x; and Rydahl, P., Hagelskjaer, L., Pedersen, L., Bojer, O. Q., 2003: "User interfaces and system architecture of a web-based decision support system for integrated pest management in cereals"; EPPO Bulletin 33, 473-481. 10.1111/j.1365-2338.2003.00684.x), WeedSOFT (Neeser, C., Dille, J. A., Krishnan, G., Mortensen, D. A., Rawlinson, J. T., Martin, A. R., Bills, L. B., 2004: "WeedSOFT®: A weed management decision support system.", Weed sci. 52, 115-122. 10.1614/P2002-154), Weed Manager (Parsons, D. J., Benjamin, L. R., Clarke, J., Ginsburg, D., Mayes, A., Milne, A. E., Wilkinson, D. J., 2009: "Weed Manager—A model-based decision support system for weed management in arable crops", Computers and Electronics in Agriculture 65, 155-167. 10.1016/j.compag.2008.08.007), proPlant expert.com (Newe, M., Meier, H., Johnen, A., Volk, T., 2003: proPlant expert.com—an online consultation system on crop protection in cereals, rape, potatoes and sugarbeet", EPPO Bulletin 33, 443-449. 10.1111/j.1365-2338.2003.00678.x)

In case that the computer system 100 only operates on predicted target pressure data 122, such data may be directly provided from the crop state prediction model 250 to the product recommender 270 (dashed arrow). In embodiments where the optimizer adjusts the predicted data 122 with actual data 123, the optimizer 150 provides the list of targets appearing in the adjusted target pressure data to the product recommender 270. It is to be noted that the adjusted target pressure data may indicate more targets than the predicted data 122 because an unpredicted target by be identified in the field.

Each product recommendation of the retrieved plurality of product recommendations 271 includes a mix (one or more) of protection products suitable for treatment of the one or more targets identified in the target pressure data. Further, each protection product has protection product characteristics 265 describing the treatment effect of the respective protection product by target. The optimizer can retrieve the protection characteristics 265 for each product from a protection product data source 260. The protection product data source 260 can be an integral part of the computer system 100 or it may be provided by a remote computer which can be accessed by the computer system. For example, the protection product data source 260 may be provided by the same computer running the product recommender module 270. The protection product characteristics 265 provide an input to the optimizer to compute a change in the target pressure score when a particular product mix is applied to the field at a particular day.

For this purpose, the protection product characteristics 265 include a treatment efficiency indicator 261 by respective target describing the effect of the treatment by the respective protection product on the respective target. Typically, the treatment efficiency is "0" if there is no treatment effect of the product against a respective target, and "1" if there is a full treatment effect associated. A partial treatment effect may be indicated as "0.5". More details regarding the treatment efficiency indicator 261 are discussed in the context of FIG. 4A.

Further, protection product characteristics 265 include at least one effective treatment period by respective target. The effective treatment period indicates a time duration during which the application of the respective product shows a positive treatment effect. In general, there may be protection products which do not show any treatment effect with respect to certain targets. However, in a real world field situation there typically exist one or more protection products which promise a positive treatment effect with regards to already present or predicted targets when applied to the field. There are three different types of effective treatment periods:

a protective effect period 262 by respective target: the protective effect period represents a future time interval following an application of the respective protection product during which the crop stays protected against the respective target after the application of the respective protection product. In other words, the protective effect period is an indicator to which extent the application of the respective product in the filed can prevent the crop from the corresponding biotic stress factor;

a curative effect period 263 by respective target: the curation effect period represents a past time interval during which the crop is retroactively protected from the application of the respective protection product against the respective target. In other words, the curative effect period is an indicator for the effectiveness of the treatment of a target which already was present before the respective product is applied in the field. The curative effect means that crop leaves stay at least in the health status as of the day of product application; and an eradicative effect period 264 by respective target: the eradicative effect period represents a future application date for the respective protection product against the respective target, leading to a complete eradication of plant pathogens within said crop following the protection product application. In other words, targets already present on or inside the leaves are cleaned (on the day when applying the product) and a healthy plant remains. Protection products with eradicative effect are known in relation to fighting ectoparasitic infections (e.g., mildew).

The optimizer 150 further has a combinations module 152 which generates a plurality of combinations of product recommendations and product application time slots. A particular combination includes a particular protection product mix with a particular product application date.

There may be a high number of product mix alternatives (sub-combinations) for given product recommendations. Thereby, the combinations module 152 generates all meaningful combinations of recommendations dependent on their corresponding BBCH ranges.

Typically, there are more than one [N] product recommendations [p] available (counted as N(p)). For each product recommendation which may include one or more products, and which can be applied in a BBCH-range [e.g. 30-36=7 "days"] the combinations module creates a unique, sorted list of sub-combinations where the total number of sub-combinations equals: Product[i=1 . . . p, p>1](BBCH-Range[i])+Sum[i=1 . . . p, p>0](BBCH-Range[i]) which can also be expressed in the following formula:

Number of Combinations =

$$\prod_1^{p:p>1} (BBCH(i)_{To} - BBCH(i)_{From}) + \sum_1^{p:p>0} (BBCH(i)_{To} - BBCH(i)_{From})$$

If the BBCH-ranges are spread over more than one day, the number of combinations increases significantly.

Examples assuming BBCH-Ranges not spread over more than one day.
a) Ele 30-31, Cap 40-49
    BBCH-Range[30-31]*BBCH-Range[40-49]* . . . +BBCH-Range[30-31]+BBCH-Range[40-49]+ . . . =[2]*[10]+[2]+[10]=32
b) Ele 30-36, Cer 37-59
    BBCH-Range[30-36]*BBCH-Range[37-59]* . . . +BBCH-Range[30-36]+BBCH-Range[37-59]+ . . . =[7]*[23]+[7]+[23]=191
c) Ele 30-31
    BBCH-Range[30-31]*0 (p<0)* . . . +BBCH-Range[30-31]+ . . . =[2]*[0]+[2]=2
d) Ele 30-36, Cer 37-59, Osi 60-69
    BBCH-Range[30-36]*BBCH-Range[37-59]*BBCH-Range[60-69]* . . . +BBCH-Range[30-36]+BBCH-Range[37-59]+BBCH-Range[60-69]+ . . . =[7]*[23]*[10]+[7]+[23]+[10]=1650

That is, each meaningful sub-combination of protection products is then combined with a potential application date. If the predetermined future time period for demining the target pressure score includes i days, there are i combinations for each sub-combination.

Figure 6:
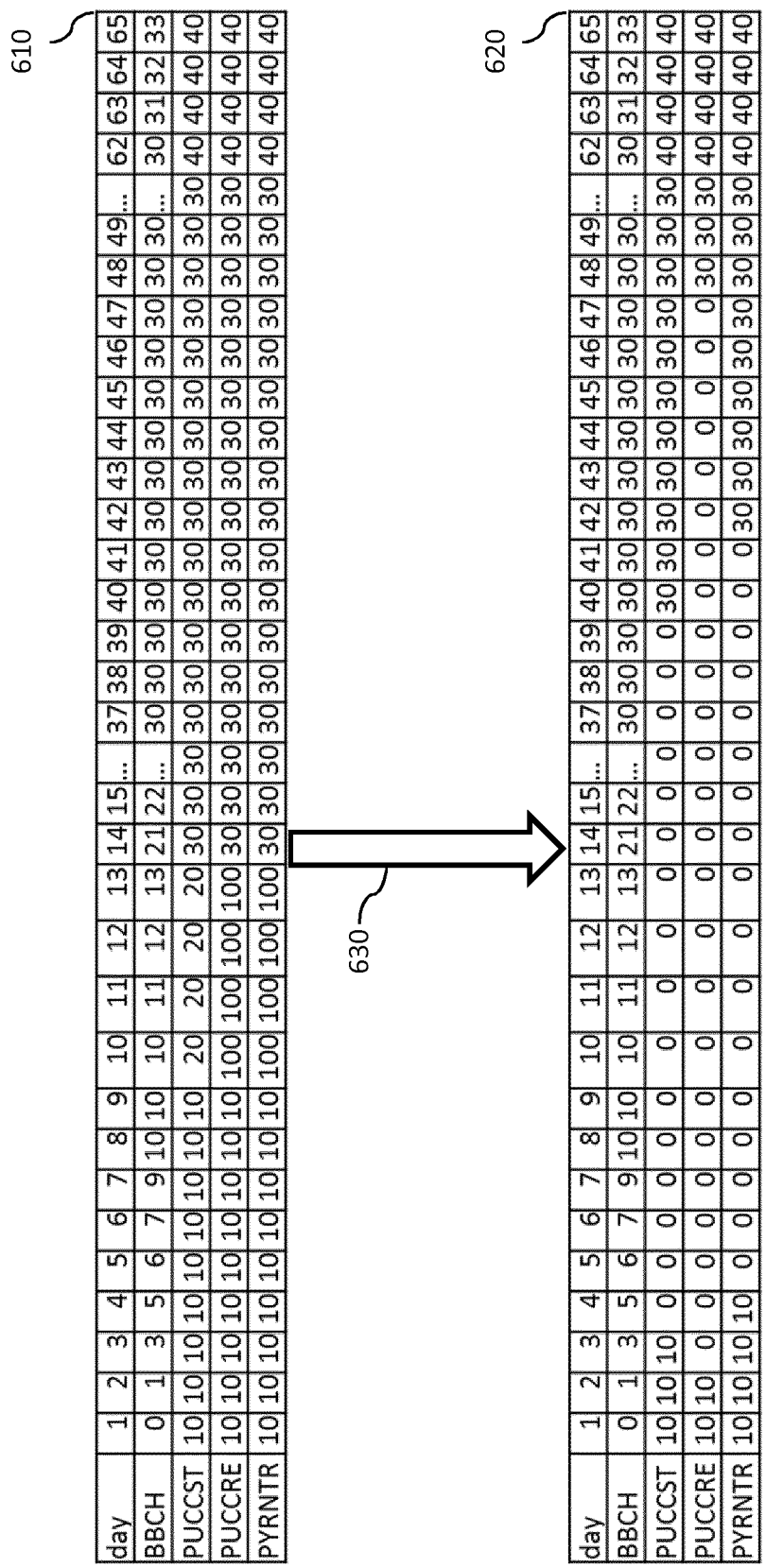
FIG. 6 shows tables used for target pressure score determination before and after protection product application.

For each identified possible combination the combinations module 152 applies the protection product characteristics 265 associated with said combination to the target pressure data (predicted or adjusted). In other words, the optimizer generates for each possible combination a target pressure matrix which modifies the original (predicted or adjusted) target pressure matrix in accordance with the treatment efficiency indicators 261 and the associated effective treatment periods (e.g., 262, 263, 264). For a particular protection product or a sub-combination there may be multiple treatment efficiency periods to be taken into account. For example, most products have a protective and a curative effect when applied to a particular target. Such effects are discussed in more detail in the context of FIGS. 4B to 4D. FIG. 6 illustrates a particular example of a target pressure matrix which is generated by applying the respective product characteristics 265 to the predicted or adjusted target pressure data for which the original target pressure score was determined. The example shows where target pressures are reduced to 0 as a consequence of the treatment effect caused by the respective combination.

The TP scorer 151 now determines 1500 a target pressure score for each of the generated target pressure matrices. In other words, each matrix can be understood as a prediction of a target pressure situation for the case that the respective combination (product mix+application date) is applied to the field. The target pressure score for such a combination is therefore a measure to which extent the protection of the crop in the field can be improved. In general, the target pressure score is a measure for the non-protected time interval for the crop in the field which would occur when applying the respective combination in the field. Advantageously, target pressure values are reduced when applying the product characteristics to the initial target pressure matrix. This leads to a reduced target pressure score for each combination which has a positive treatment effect on the crop.

The scorer 151 then selects 1600 the combination with the target pressure value indicating the lowest non-protected time interval for the crop in the field as recommended combination. In optional embodiments, the recommended combination can stand for the combination which is provided 1710 to the farming user (e.g., via I/O device 210) to be applied 1800 to the field, or which is automatically transformed into a corresponding control instruction 230 provided 1720 to a sprayer appliance 240 for controlling the generation of a corresponding spray mix.

In cases where the optimizer 150 selects a combination as recommended combination where, for some reason, the farming user is not able to follow the recommendation (e.g., one of the products may not be available in time to meet the application date of the recommended combination), the computer system 100 can further provide 1730 a ranking list to the farming user. The ranking list includes further combinations indicating potential substitute protection product mixes. Thereby, the ranking may be performed based on the respective target pressure scores to reflect an increasing non-protected time interval for the crop in the field for lower ranking combinations. In other words, the combination with the second best treatment effect will follow the recommended combination, and so on.

Figure 3:
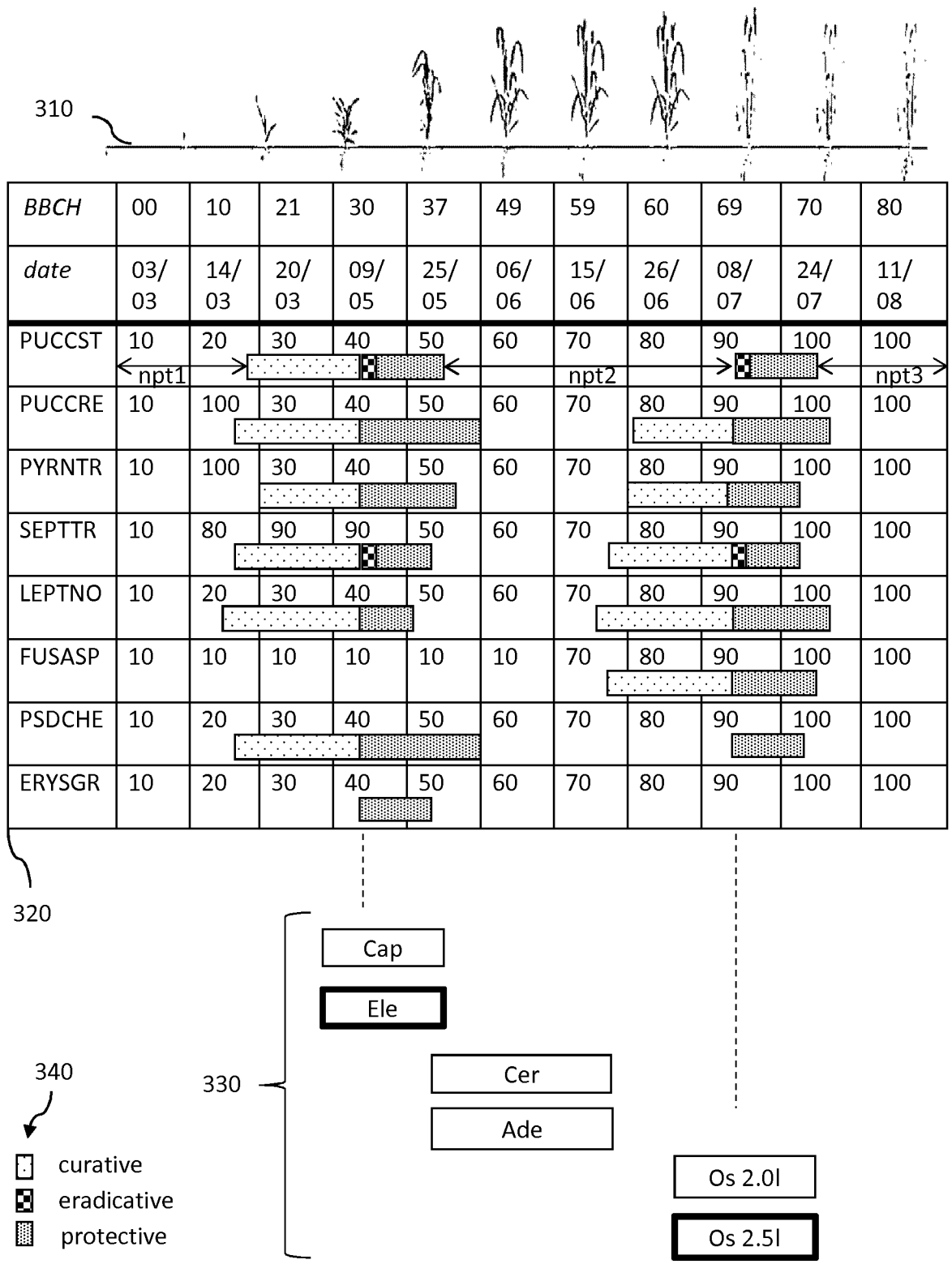
FIG. 3 illustrates predicted target pressure data for different growth stages of a particular crop and treatment effects of particular protection products.

FIG. 3 illustrates predicted target pressure data for different growth stages BBCH of a particular crop (as received from the crop state prediction model) and treatment effects 340 of particular protection products 330 (as defined by respective protection product characteristics). The table 320 is structured in the following way. There are two header lines, "BBCH" (with growth stage codes) and "date" (showing a particular date during the respective growth stage), above the bold separation line. Below this line, the target pressure value matrix with target pressure probabilities (in percentages) for each target. The targets are identified by their respective Eppo Codes (PUCCST, PUCCRE, etc.) in accordance with table 1 below.

TABLE 1

| Eppo Codes for targets | |
|---|---|
| EppoCode | Target Name |
| PUCCST | Yellow rust |
| PUCCRE | Brown rust |
| PYRNTR | Tan spot |
| SEPTTR | Leaf spot |
| LEPTNO | Septoria nodurum |
| FUSASP | Fusarium head blight |
| PSDCHE | Eye Spot |
| ERYSGR | Powdery Mildew |

It is to be noted that FIG. 3 is a simplified visualization. Of course, each BBCH code is associated with a whole time period which can include a plurality of days. The shown dates are just a representative date of the respective growth period. The illustration 310 of the growth stages of the respective crop shows a simplified view of the crop growth in the respective growth stages. The protection products 330 are provided by the product recommender as potential products to be applied against the targets in matrix 320. In the following example acronyms are used to represent real protection products: Cap, Ele, Cer, Ade, CerVeg, Os 2.0 l, Os 2.5 l. Cap and Ele are recommended for BBCH code 30. Cer and Ade are recommended for BBCH-ranges 37-59. Os 2.0 l and Os 2.5 l are recommended for BCCH code 69. The example visualizes effective treatment periods (indicated by the patterns as shown in legend 340) of Ele (bold frame) when applied to the field on May 9 (09/05) and Os 2.5 l (bold frame) when applied to the field on July 8 (08/07) of the current year. The length of the pattern bars representing the effective treatment periods indicate the period lengths in days.

For example, when applying Ele to Yellow rust PUCCST, an eradicative effect occurs on the day of application. In addition, a curative effect with a retroactive effect back to BBCH code 10 occurs. The protective effect lasts into the future until BBCH code 37. The tables in FIGS. 4B to 4C provide a detailed example of effective treatment periods in days. It is to be noted that the fictitious values given in the tables are chosen for merely explaining the computations which are performed in accordance with the inventive method and do not necessarily correspond to real world values. Ele also has an eradicative effect against leaf spot SEPTTR whereas no effect at all occurs against *Fusarium* head blight FUSASP. Against Powdery Mildew ERYSGR only a protective effect occurs. For the remaining targets, Cap has a curative and a protective effect. When applying Os 2.5 l, an eradicative effect again occurs only for the targets PUCCST and SEPTTR. No effect is achieved for ERYSGR.

The system can now determine non-protected time periods npt* for each of the targets for a given combination. In the example, adding the time intervals npt1, npt2, npt3 for target PUCCST results in the non-protected time period for PUCCST for said combination including Ele and Os 2.5 l. These considerations are evaluated by the computer system in relation to any target for any combination of protections products and respective application dates. For each combination, a non-protected time index can be computed by summing up all non-protected time intervals (in days) for all targets.

For the exact computation of the corresponding target scores the system uses the protection properties of the respective protection products. FIGS. 4A to 4D illustrate the treatment efficiency indicators and the effective treatment periods for the various targets.

Table 410 of FIG. 4A shows the treatment efficiency index of each product (Cap, Ele, etc.) for each of the targets (PUCCST, PUCCRE, etc.) with regards to growth stage periods (BBCH from, BBCH to) of the respective crop during which application is possible. For example, Cap can be applied during a time interval which encloses the BBCH growth stages 30 to 36 and has 50% treatment efficiency for PUCCST and no treatment efficiency for FUSAP whereas against all other targets the treatment efficiency is at 100%. When determining the possible combinations between protection product mixes and application days, only application days within the corresponding [BBCH from, BBCH to] time interval are considered for the respective product(s).

Table 420 of FIG. 4B illustrates the protective effect periods in days for each product in the column PName with regards to the various targets. For example, Ele has no protective effect periods with regards to FUSAP. However, for example, with regards to PUCCRE the protective effect period is 24 days.

Table 430 of FIG. 4C illustrates the curative effect periods in days for each product in the column PName with regards to the various targets. For example, Ele has no curative effect periods with regards to ERYSGR and FUSAP. However, for example, with regards to PUCCRE the curative effect period is 20 days.

Table 440 of FIG. 4D illustrates the eradicative effect periods for each product in the column PName with regards to the various targets. The eradicative effect period is always 1 day because the eradicative effect occurs on the day of product application. The eradicative effect is known for all products in table 2 but only for the targets PUCCST and SEPTTR.

FIG. 6 illustrates an example where the protection product characteristics of a particular combination are applied 630 to an initial/adjusted target pressure matrix 610 resulting in a treated target pressure matrix 620. In this example, it is assumed that a protection product is available which can be applied 630 on the day corresponding to growth stage BBCH=21 with respective protective and curative effect periods. The matrix 610 includes a target pressure value for each target (PUCCST, PUCCRE, PYRNTR) on each day (starting with day 1). The BBCH row illustrates the crop growth stage on the respective day. Based on the product recommendations, the optimizer forms all meaningful product mix combinations taking into account the possible application time intervals [BBCH from, BBCH to] for each product. In the following, the treatment efficiency indicators of the product(s) in the combination is applied to the initial/adjusted target pressure matrix 620 in accordance with the effective treatment period(s) and possible application dates. The treatment effect for the product mix and application date of the example is illustrated in the treated target pressure matrix 620. A 100% treatment efficiency of the respective product(s) reduces the target pressure values in relation to PUCCST to 0 starting on day 4 an ending with day 39. For PUCCRE the treatment effect occurs starting with day 3 and ending with day 47, and for PYRNTR the treatment interval reaches form day 5 to day 41.

The TP scorer of the optimizer now computes the target pressure score for the treated target pressure matrix 620. This computing task is repeated for all possible combinations leading to a plurality of target pressure scores. In the example, the optimizer finally selects the combination associated with the lowest target pressure score. The lowest target pressure score indicates the highest treatment effect amongst the possible combinations and therefore leads to the lowest non-protected time interval for the crop in the field. The selected combination is then recommended as recommended combination to the farming user, or it is directly transformed in a respective control instruction for a sprayer appliance.

FIG. 7 schematically illustrates an embodiment of a user interface 700 to provide a ranking list of alternative combinations to the farming user. The combination with the product mix P1, P2, P4 applied to the field on day D1 is the preferred combination as it is associated with the optimal target score TS (e.g., the lowest score of the target pressure matrices of all possible combinations). This top ranking combination is followed by three potential substitute combinations (P1, P3, P4 applied to the field on day D2; P2, P4 applied to the field on day D1; P4 applied to the field on day D1). The substitute combinations perform worse than the top ranking solution because they ensure a shorter non-protected time period for the field. This is indicated by the target pressure scores which are higher than the target score TS of the best performing combination with $\Delta TS1 < \Delta TS2 < \Delta TS3$.

FIG. 5 illustrates an embodiment where, in addition to product characteristics associated with product recommendations, the optimizer can take into account further optimization factors in accordance with the formulas 501, 502.

Formula 501 shows that the target pressure score f(p) is minimized with regards to all possible combinations P by finding the minimum score in the range p=1 to P.

Formula 502 illustrates possible factors which can influence the target pressure score computation. The target pressure score f(p) for a particular combination is computed as the sum of the influencing factors over all targets t=1 to T. The most influencing factor is the sum of the target pressure probabilities TP as previously described in great detail. The target pressure probabilities may be weighted with a target specific weighting factor to take into account that certain targets may be less critical for the crop yield in the field than others.

A further influencing factor can be the non-protected time index which can be computed by adding the number of unprotected days NPT in the predetermined future time interval for all targets of a particular combination. Again, target specific weights K_NPT may be used to appreciate the different impacts of different targets on the crop yield. The weights K_NPT may also be used to ensure a lower weight of the non-protected time index versus the target pressure probabilities for the overall target pressure score.

Further influencing factors PC (with or without additional weights K_PC) may be considered when computing the overall target pressure sore f(p). For example, such influencing factors may relate to the environmental impact of a particular product mix or to the associated production cost. However, typically the weights for such additional indices are chosen such that the main influence to the overall target pressure score results from the target pressure probabilities, and optionally, from the non-protected time intervals.

Figure 8:
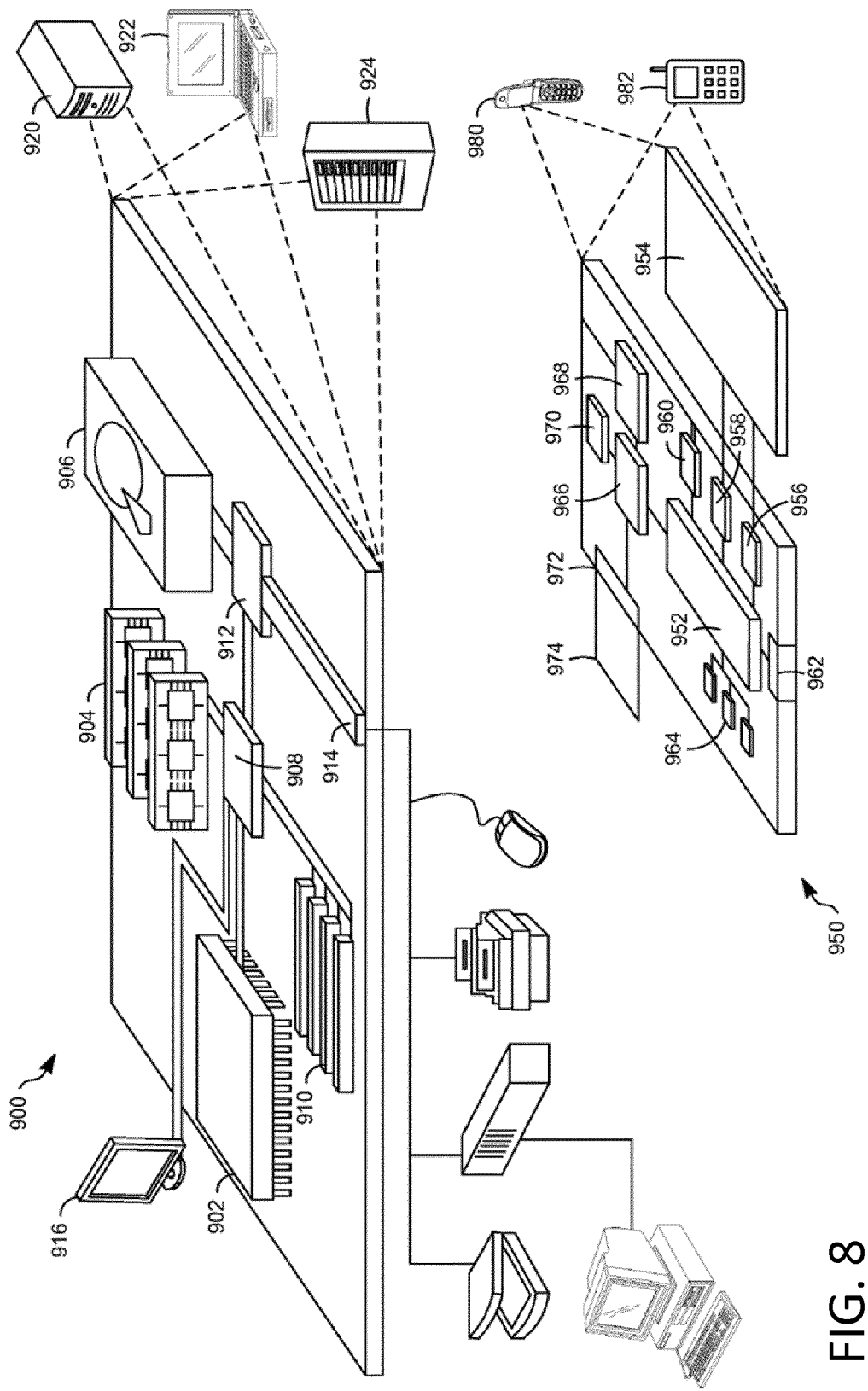
FIG. 8 is a diagram that shows an example of a generic computer device and a generic mobile computer device, which may be used in embodiments of the invention.

FIG. 8 is a diagram that shows an example of a generic computer device 900 and a generic mobile computer device 950, which may be used with the techniques described here. In some embodiments, computing device 900 may relate to the system 100 (cf. FIG. 1). Computing device 950 is intended to represent various forms of mobile devices, such as personal digital assistants, cellular telephones, smart phones, and other similar computing devices. In the context of this disclosure, the computing device 950 may be used as a frontend by a farmer operating in a field to capture the current field situation for the input which is then provided to the device 900 to execute the generated program logic. In other embodiments, the entire system 100 may be implemented on the mobile device 950. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method (1000) for optimizing crop protection for a particular crop grown in a particular field, the method comprising:
receiving (1200), by a computer system from a crop state prediction model (250), in relation to a predetermined future time interval, predicted target pressure data (122) for one or more targets, the predicted target pressure data representing expected biotic stress factor probabilities for said crop during the predetermined future time interval in view of real-time weather forecast data (210) for the particular field, wherein a particular biotic stress factor, referred to as a target, is one of: a disease, an animalistic pest, or a weed, affecting said crop;

determining (1300), by the computer system, an initial target pressure score for the particular field by aggregating all target pressure data in the predetermined future time interval;

retrieving (1400), by the computer system from a protection product recommender (270), a plurality of product recommendations (271) with each product recommendation including a mix of protection products suitable for treatment of the one or more targets, and each protection product having protection product characteristics (265) describing the treatment effect of the respective protection product by target, wherein the protection product characteristics (265) comprise a treatment efficiency indicator (261) by respective target describing the effect of the treatment by the respective protection product on the respective target, and at least one effective treatment period (262, 263, 264) by respective target;

receiving (1250) real-time diagnostic data for said crop wherein the real-time diagnostic data includes actual target pressure data estimates for at least one target being present in the field;

adjusting (1270) the corresponding received target pressure data in accordance with the at least one estimate prior to determining (1500) further target pressure scores;

determining (1500), by the computer system, for the particular field the further target pressure scores for a plurality of combinations of product recommendations and product application time slots by applying (630) the respective protection product characteristics (265) to the target pressure data;

selecting (1600), by the computer system, the combination associated with the target pressure score indicating the lowest expected biotic stress for the crop in the field as a recommended combination if the target pressure score of said combination is lower than the initial target pressure score; and generating and transmitting, by the computer system, a control instruction to transmit to a sprayer appliance based on the recommended combination to control the sprayer appliance.

2. The method of claim 1, wherein the at least one effective treatment period comprises one or more of the following:
a protective effect period (262) by respective target wherein the protective effect period represents a future time interval following an application of the respective protection product during which future time interval the crop stays protected against the respective target after the application of the respective protection product,
a curative effect period (263) by respective target wherein the curation effect period represents a past time interval during which past time interval the crop is retroactively protected from the application of the respective protection product against the respective target, and
an eradicative effect period (264) by respective target wherein the eradicative effect period represents a future application date for the respective protection product against the respective target, leading to a complete eradication of plant pathogens within said crop following the protection product application.

3. The method of claim 1, wherein determining (1500) further target pressure scores for a plurality of combinations of product recommendations and product application time slots further comprises:
determining, for each combination of the plurality, non-protected time intervals per target based on the effective treatment periods of the respective protection products;
computing, based on the non-protected time intervals, an aggregate non-protected time index for each combination; and
adding the aggregate non-protected time indices to the respective target pressure scores.

4. The method of claim 1, further comprising:
providing (1710) the selected combination as a protection product mix recommendation with product application time slots for the particular field to a farming user.

5. The method of claim 1, further comprising:
providing (1720) the selected combination as control instruction (230) for a sprayer appliance (240) to generate a tank mix with the crop protection products of the selected combination.

6. The method of claim 1, further comprising:
providing (1730) a ranking list with further combinations indicating potential substitute protection product mixes wherein the ranking is performed based on the respective target pressure scores to reflect an increasing non-protected time interval for the crop in the field for lower ranking combinations.

7. The method of claim 6, further comprising:
applying (1800) the product mix of the selected combination or of a potential substitute combination to the particular field at the respective product application time slots.

8. The method of claim 7, wherein the respective product application time slots relate to one or more days associated with a BBCH code of said crop.

9. The method of claim 1, wherein the protection product characteristics are provided via respective time and weather dependent models.

10. A non-transitory computer-readable medium comprising instructions that when loaded into a memory of a computer system and being executed by at least one processor of the computer system cause the computer system to perform the method steps according to claim 1.

11. A computer system (100) for optimizing crop protection for a particular crop in a particular field, the system comprising:
an interface (110) configured to receive a predetermined future time interval and real-time weather forecast data (210);
an optimizer (150) configured to:
receive, from a crop state prediction model (250), predicted target pressure data (122) for one or more targets in relation to the predetermined future time interval, the predicted target pressure data (122) representing expected biotic stress factor probabilities for said crop during the predetermined future time interval in view of real-time weather forecast data (210) for the particular field, wherein a particular biotic stress factor, referred to as a target, is one of: a disease, an animalistic pest, or a weed, affecting said crop;
determine an initial target pressure score for the particular field by aggregating all target pressure data in the predetermined future time interval;

retrieve, from a protection product recommender (270), a plurality of product recommendations with each product recommendation including a mix of protection products suitable for treatment of the one or more targets, and each protection product having protection product characteristics (265) describing the treatment effect of the respective protection product by target wherein the protection product characteristics comprise a treatment efficiency indicator (261) by respective target describing the effect of the treatment by the respective protection product on the respective target, and at least one effective treatment period (262, 263, 264) by respective target;

receive (1250) real-time diagnostic data for said crop wherein the real-time diagnostic data includes actual target pressure data estimates for at least one target being present in the field;

adjust (1270) the corresponding received target pressure data in accordance with the at least one estimate prior to determining (1500) further target pressure scores;

determine the further target pressure scores for a plurality of combinations of product recommendations and product application time slots by applying the respective protection product characteristics (265) to the target pressure data;

select the combination associated with the target pressure score indicating the lowest expected biotic stress for the crop in the field as a recommended combination if the target pressure score of said combination is lower than the initial target pressure score; and generate and transmit a control instruction to transmit to a sprayer appliance based on the recommended combination to control the sprayer appliance.

12. The system of claim 11, wherein the at least one effective treatment period comprises one or more of the following:

a protective effect period (262) by respective target wherein the protective effect period represents a future time interval following an application of the respective protection product during which the crop stays protected against the respective target after the application of the respective protection product, a curative effect period (263) by respective target wherein the curation effect period represents a past time interval during which the crop is retroactively protected from the application of the respective protection product against the respective target, and an eradicative effect period (264) by respective target wherein the eradicative effect period represents a future application date for the respective protection product against the respective target, leading to a complete eradication of plant pathogens within said crop following the protection product application.

13. The system of claim 11, wherein the optimizer is further configure to determine the further target pressure scores by:

determining, for each combination of the plurality, non-protected time intervals per target based on the effective treatment periods of the respective protection products;

computing, based on the non-protected time intervals, an aggregate non-protected time index for each combination; and adding the aggregate non-protected time indices to the respective target pressure scores.

14. The system of claim 11, wherein the interface (110) is further configured to:

provide the selected combination as a protection product mix recommendation with product application time slots for the particular field to a farming user, and/or provide the product mix information of the selected combination as control instruction (230), for generating a tank mix with the crop protection products of the selected combination, to a sprayer appliance (240).

* * * * *